United States Patent Office 3,499,022
Patented Mar. 3, 1970

3,499,022
BENZYL PROPYNYLTHIOLCARBAMATES
John Joseph D'Amico, Dunbar, W. Va., assignor to Monsanto Company, St. Louis, Mo., a corporation of Delaware
No Drawing. Filed Dec. 1, 1967, Ser. No. 687,141
Int. Cl. C07c *155/02;* A01n *9/20*
U.S. Cl. 260—455                                6 Claims

ABSTRACT OF THE DISCLOSURE

Benzyl N-alkyl-N-propynylthiolcarbamates wherein alkyl contains 1 to 4 carbon atoms. The compounds destroy undesired vegetation.

---

The invention relates to benzyl N-alkyl-N-propynylthiolcarbamates and to their use for destroying undesired vegetation.

Esters of thiolcarbamic acids comprise important pre-emergence herbicides. However, a narrow class has been found which are efficient contact herbicides. Benzyl N-lower alkyl-N-propynylthiolcarbamates are contact herbicides and possess other valuable biological properties. The alkyl group preferably contains 1 to 4 carbon atoms.

Specific embodiments illustrating the invention follow.

EXAMPLE 1

To a mixture of 9.8 grams (0.1 mole) of N-isopropyl-2-propynylamine, 300 ml. of ethyl ether, and 13.8 grams (0.1 mole) of potassium carbonate, stirred at 5° C., is added dropwise at a temperature of 5°–10° C. in 15 minutes 18.7 grams (0.1 mole) of benzyl chlorothiolformate. The mixture is stirred at 25°–30° C. for 24 hours, 300 ml. of water added, and the mixture stirred again for 15 minutes. The ether layer is separated, washed with water until the washings are neutral to litmus, and dried over sodium sulfate. The ether is removed in vacuo at a maximum temperature of 80°–90° C. at 1–2 mm. Benzyl isopropyl-2-propynylthiolcarbamate is obtained in 89.5% yield as an amber oil, soluble in ether, acetone, benzene, heptane, and ethanol but insoluble in water. Analysis gives 5.70% nitrogen and 12.97% sulfur as compared to 5.66% nitrogen and 12.96% sulfur calculated for $C_{14}H_{17}NOS$.

EXAMPLE 2

To a stirred slurry of 19.5 grams (0.2 mole) of N-propyl-2-propynylamine, 500 ml. of ethyl ether, and 28 grams (0.2 mole) of potassium carbonate is added, dropwise at a temperature of 5°–15° C., 37.4 grams (0.2 mole) of benzyl chlorothiolformate. The mixture is stirred at 25°–30° C. for 24 hours, 300 ml. of water added, and stirring continued for 15 minutes. The ether layer is separated, washed with water until the washings are neutral to litmus, and dried over sodium sulfate. The ether is removed in vacuo at a maximum temperature of 80°–90° C./1–2 mm. Benzyl propyl-2-propynylthiolcarbamate is obtained in 97% yield as an amber oil soluble in ether, acetone, benzene, heptane, and ethanol but insoluble in water. Analysis gives 5.35% nitrogen and 13.13% sulfur as compared to 5.66% nitrogen and 12.96% sulfur calculated for $C_{14}H_{17}NOS$.

EXAMPLE 3

To a stirred solution comprising 8.3 grams (0.1 mole) of N-ethyl-2-propynylamine, 500 ml. of ether, and 14 grams (0.1 mole) of potassium carbonate is added in one portion 18.7 grams (0.1 mole) of benzyl chlorothiolformate. The mixture is stirred at 25°–30° C. for 24 hours, 300 ml. of water added, and stirring continued for 15 minutes. The ether layer is separated, washed with water until the washings are neutral to litmus, and dried over sodium sulfate. The ether is removed in vacuo at a maximum temperature of 80°–90° C./1–2 mm. Benzyl ethyl-2-propynylthiolcarbamate is obtained in 98% yield as an amber oil soluble in ether, acetone, benzene, heptane, and ethanol but insoluble in water. Analysis gives 6.02% nitrogen and 14.07% sulfur as compared to 6.00% nitrogen and 13.74% sulfur calculated for $C_{13}H_{15}NOS$.

EXAMPLE 4

To a mixture of 11.1 grams (0.1 mole) of N-2-propynyl-butylamine, 500 ml. of ethyl ether, and 14 grams (0.1 mole) of potassium carbonate stirred at 5° C. is added, dropwise at 5° to 15° C., 18.7 grams (0.1 mole) of benzyl chlorothiolformate. The mixture is then stirred at 25° to 30° C. for 24 hours, 300 ml. of water added, and again stirred for 15 minutes. The ether layer is separated, washed with water until the washings are neutral to litmus, and dried over sodium sulfate. The ether is removed in vacuo at a maximum temperature of 80° to 90° C. at 1–2 mm. Benzyl butyl-2-propynylthiolcarbamate is obtained in 91% yield as an amber oil soluble in ether, acetone, benzene, heptane, and ethanol but insoluble in water. Analysis gives 5.58% nitrogen and 11.99% sulfur as compared to 5.36% nitrogen and 12.27% sulfur calculated for $C_{15}H_{19}NOS$.

EXAMPLE 5

To a mixture of 6.9 grams (0.1 mole) of N-methyl-2-propynylamine, 500 ml. of ether, and 14 grams (0.1 mole) of potassium carbonate stirred at 5° C. is added 18.7 grams (0.1 mole) of benzyl chlorothiolformate, dropwise at a temperature of 5° to 15° C. The mixture is stirred at 25° to 30° C. for 24 hours, 300 ml. of water added, and again stirred for 15 minutes. The top ether layer is separated, washed with water until the washings are neutral to litmus, and dried over sodium sulfate. The ether is removed in vacuo at a maximum temperature of 80° to 90° C./1–2 mm. Benzyl methyl-2-propynyl-thiolcarbamate is obtained in 96% yield as an amber oil soluble in ether, acetone, benzene, heptane, and ethanol but insoluble in water. Analysis gives 6.62% nitrogen and 14.82% sulfur as compared to 6.39% nitrogen and 14.62% sulfur calculated for $C_{12}H_{13}NOS$.

Undesired vegetation of both narrow-leaf and broad-leaf types is destroyed at low rates of application. One of the most prevalent broadleaf weeds, pigweed, is effectively controlled. Tillering and other formative effects are often observed.

As illustrative of contact herbicidal properties, a counted number of seeds of various grasses and broadleaf plants is planted in standard soil preparation in a flat aluminum pan. The pan is perforated on the bottom for proper drainage. The pans of planted seeds are placed in a moist greenhouse bench and allowed to take up water from below. Two weeks after the seedlings emerge they are sprayed with a 0.5% concentration of spray. The amount of spray applied to the test area is approximately 9 pounds per acre. After 15 days the plants are observed and all injuries noted. The degree of injury is recorded by use of a numerical rating in which 0 means no injury;

1, slight injury; 2, moderate injury; 3, severe injury; and 4 means that the plant is dead at the time of observation. Typical results are summarized below for benzyl alkyl-2-propynlthiolcarbamates. The particular alkyl radical is designated at the head of the column in which the corresponding toxicity ratings are recorded for each test plant.

| | Alkyl radical of benzyl alkyl-2-propynylthiolcarbamate | | | |
|---|---|---|---|---|
| | Isopropyl | Propyl | Ethyl | Methyl |
| | CP Number | | | |
| | 26047 | 26529 | 26561 | 26624 |
| Morning glory | 2 | 2 | 3 | 1 |
| Wild oat | 3 | 3 | 2 | 3 |
| Brome | 1 | 2 | 2 | 3 |
| Rye grass | 1 | 1 | 1 | 2 |
| Radish | 0 | 2 | 2 | 4 |
| Sugar beet | 0 | 0 | 1 | 1 |
| Foxtail | 3 | 1 | 4 | 3 |
| Crab grass | 4 | 2 | 3 | 4 |
| Pigweed | 3 | 3 | 4 | 4 |
| Soybean | 1 | 1 | 1 | 1 |
| Wild buckwheat | 1 | 0 | 2 | 3 |
| Tomato | 2 | 0 | 4 | 4 |
| Sorghum | 3 | 2 | 2 | 3 |

The corresponding ethyl, isopropyl, and butyl esters are not phytotoxic under similar conditions. In pre-emergence application at 0.5 pound per acre, benzyl N-ethyl-N-propynylthiolcarbamate partly controls *Sorghum almum* and Johnson grass.

The new compounds exert fungistatic activity. The benzyl N-alkyl-N-propynylthiolcarbamates wherein alkyl is ethyl, propyl, or butyl are toxic to *Venturia inaequalis*, causative organism of apple scab. Applied at a concentration of ten parts per million, only slight growth of the organism is observed. Benzyl N-methyl-N-propynylthiolcarbamate is toxic to the fungi *Pythium ultimum*. Only slight growth is observed at an application of 30 parts per million on cornmeal-sand particles inoculated with the organism, whereas the normal growth is observed with the untreated soil. Furthermore, the new compounds are chemosterilants. For example, when benzyl N-isopropyl-N-propynylthiolcarbamate is fed to adult screw-worm flies at a concentration of 1%, the subsequent eggs are completely infertile.

It is intended to cover all changes and modifications of the examples of the invention herein chosen for purposes of disclosure which do not constitute departures from the spirit and scope of the invention.

What is claimed is:

1. Benzyl N - alkyl - N - (2 - propynyl)thiolcarbamate wherein alkyl contains 1 to 4 carbon atoms, inclusive.
2. Compound of claim 1 wherein alkyl is isopropyl.
3. Compound of claim 1 wherein alkyl is propyl.
4. Compound of claim 1 wherein alkyl is ethyl.
5. Compound of claim 1 wherein alkyl is butyl.
6. Compound of claim 1 wherein alkyl is methyl.

References Cited

Sato: "Chem. Abstracts," vol. 51 (1957), p. 17760.

CHARLES B. PARKER, Primary Examiner

D. R. PHILLIPS, Assistant Examiner

U.S. Cl. X.R.
71—100; 424—300